United States Patent [19]

Bewley

[11] 4,287,068

[45] Sep. 1, 1981

[54] POWDERED METAL FILTER COMPOSITION AND PROCESSES FOR PRODUCING THE SAME

[75] Inventor: James G. Bewley, Tinton Falls, N.J.

[73] Assignee: Metallurgical International, Inc., Tinton Falls, N.J.

[21] Appl. No.: 72,415

[22] Filed: Sep. 4, 1979

Related U.S. Application Data

[63] Continuation-in-part of Ser. No. 915,383, Jun. 14, 1978, Pat. No. 4,166,736.

[51] Int. Cl.³ .................. B01D 39/20; B22D 23/08; C22C 38/02
[52] U.S. Cl. ............................ 210/510; 75/0.5 BA; 75/0.5 C; 75/251; 75/252
[58] Field of Search .......................... 210/500, 510; 75/0.5 BA, 0.5 BB, 0.5 C, 251, 252

[56] References Cited

U.S. PATENT DOCUMENTS

| | | | |
|---|---|---|---|
| 3,704,115 | 11/1972 | Wastenson et al. | 75/251 X |
| 3,716,354 | 2/1973 | Reen | 75/128 W |
| 4,028,094 | 6/1977 | Reen et al. | 75/0.5 BA |
| 4,166,736 | 9/1979 | Bewley | 75/0.5 BA |

*Primary Examiner*—Ferris H. Lander

[57] ABSTRACT

A powdered metal filter composition and processes for producing the same by water atomization in which the composition exhibits an apparent density, compressibility and particle shape as a function of the composition chemistry and in particular the silicon, carbon and manganese content as well as the angle of intersection of the atomizing water jets; the composition providing an optimization of filtration efficiency, pressure drop across the filter pack, resistance to pressure deformation of the composition particles and the useful life of both the filter pack and the composition and the process producing such a composition with well-known apparatus and optimum yields of useful, particle-size fractions.

17 Claims, No Drawings

POWDERED METAL FILTER COMPOSITION AND PROCESSES FOR PRODUCING THE SAME

CROSS-REFERENCE

This application is a continuation-in-part of my application Ser. No. 915,383 filed June 14, 1978, now U.S. Pat. No. 4,166,736.

BACKGROUND OF THE INVENTION

The inventions of both this application and the aforesaid parent application relate to a powdered metal filter composition, and processes for producing the same for the preparation filter-packs particularly useful for the filtration of the liquid polymer in the manufacture of synthetic fibers. The filtration of the liquid polymers is well-known in the art as is more completely described in U.S. Pat. No. 3,896,028.

In the past, a number of different filter media have beem employed in the synthetic fiber art including silica sand, metal shavings and metal powders. Until the advent of the aforesaid inventions, silica sand was the preferred filter media.

Silica sand exhibits a number of disadvantages. It is extremely brittle with the result that fines of silica sand develop which tend to obstruct the orifices in the fiber spinnerette. Additionally, the specific surface area of silica sand is substantially less than that of atomized metal powder for any given filter pack volume. Still further, silica sand tends to break down or fracture under pressure in the filter bed rather than deforming thereby favoring the production of fines during use.

Metal shavings exhibit less filtration efficiency than either silica sand or metal powder because of the relative lack of surface irregularities. Moreover, they tend to deform excessively or break in use.

Previously, metal powder was sintered into a filter form for convenience of handling. However, this tended to reduce filtration efficiency by reducing the specific surface area available for filtration. Moreover, the process of pressing and sintering was extremely costly. This cost factor was compounded by the fact that the rapid loss of filtration efficiency by clogging of the interstices required reprocessing by burning out the polymeric sludge which in turn tended to further reduce filtration efficiency. The result was that the sintered metal powder filter frequently had to be discarded after as few as four burn-outs.

Atomized metal powder which is prepared under specific conditions exhibits an extremely irregular surface which tends to enhance its filtration efficiency. However, previous metal powder filters prepared from loose stainless steel powder lacked the mechanical strength under pressure to maintain their apparent density within those limits for optimum filtration efficiency. Hence, the previous resort to sintering the metal powder to achieve some degree of mechanical strength.

It is among the objects and advantages of the present invention to produce a powdered metal filter composition which exhibits both the apparent density and enhanced resistance to compressibility for optimum filtration efficiency with little or no particle deformation and collapse under operating pressures. These characteristics have been achieved by increasing the percent of silicon, manganese and carbon in the metal feed for the atomization process as well as by controlling the angle of intersection of the water atomization jets with the molten metal stream.

In the parent application, a composition including 10% to 15% nickel and 2.0% to 3.0% molybenum was disclosed. Since that time, the cost of both nickel and molybdenum has increased substantially. Therefore it is the further object of this invention to reduce the nickel and molybdenum content without adversely affecting the aforesaid desirable characteristics of the composition for use as a filter media.

The processes and compositions disclosed and claimed herein achieve the desiderata high mechanical strength without embrittlement with a minimum use of nickel and molybdenum.

SUMMARY OF THE INVENTION

A powdered metal composition consisting essentially of a ferrous based alloy having by weight from approximately 0.60% to approximately 4.0% silicon; from approximately 0.05% to approximately 0.20% carbon and from 0.0% to approximately 2.0% molybdenum and exhibiting an apparent density of approximately 1.6 to 2.3 gm./cm.$^3$ A process for producing a powdered metal composition by water atomization in which a stream of molten ferrous based metal alloy having by weight from approximately 0.60% to approximately 0.20% carbon from 0.0% to approximately 2.0% molybdenum is impinged by water jets intersecting said stream at a common point with an included angle of from approximately 25° to approximately 45°.

PREFERRED EMBODIMENT OF THE INVENTION

The operative range of the powdered metal filtration composition in accordance with the instant invention is as follows:

| CONSTITUENT | % BY WEIGHT |
| --- | --- |
| Carbon | 0.05% to 0.20% |
| Manganese | 0.30% to 1.0% |
| Silicon | 0.60% to 4.0% |
| Nickel | 2.0% to 10% |
| Chromium | 16% to 26% |
| Molybdenum | 0.0% to 2.0% |
| Iron | balance |

For maximum filtration efficiency, the aforementioned composition should exhibit an apparent density of 1.6 gm./cm.$^3$ to 2.3 gm./cm.$^3$ The following test can be employed to determine the characteristics of compressibility of the composition. Ten cm.$^3$ of the atomized metal powder is placed in a cylindrical die having a diameter of 1.5 inches. The metal powder charge is compressed with a male die up to 10,000 lbs./in.$^2$ and the axial movement of the male die measured in inches. Compressibility as used herein means the movement of the male die in inches at 10,000 lbs./in.$^2$ It has been found that the metal powder should have a compressibility as measured above of 0.120 to 0.160 inches.

The optimum particle size distribution of the filter media is a function of the particular material which is being filtered as well as other operational characteristics of the filtration process. Generally speaking, a coarse filtration cut is from approximately 30 to 60 mesh, U.S. Standard. A fine particle size cut is from 50 to 100 mesh, U.S. Standard.

The preferred range chemistry of the powdered metal composition is as follows:

| CONSTITUENT | % BY WEIGHT |
|---|---|
| Carbon | 0.06% to 0.12% |
| Manganese | 0.05% to 0.9% |
| Silicon | 2.0% to 3.0% |
| Nickel | 4.0% to 7.0% |
| Chromium | 16% to 18% |
| Molybdenum | 0.0% to 1.0% |
| Iron | balance |

A typical preferred composition is as follows:

| CONSTITUENT | % BY WEIGHT |
|---|---|
| Carbon | 0.077% |
| Manganese | 0.82% |
| Silicon | 2.10% |
| Nickel | 6.15% |
| Chromium | 16.57% |
| Molybdenum | 0.39% |
| Iron | balance with traces of copper, tungsten and cobult |

The preferred apparent density for the above-referred to preferred composition is 1.94 gm./cm.$^3$ and the preferred compressibility is 0.146 inches for a particle size distribution of 30 to 60 mesh, U.S. Standards. However, with the cut of 50 to 100 mesh, the apparent density was 2.06 gr./cm.$^3$; and at 40–80 mesh, it was 1.95 gr./cm.$^3$ If one were to attempt to duplicate the preferred apparent density and compressibility designated above for the 50 to 100 mesh fraction in the 30 to 60 mesh fraction, the yield would be extremely small. In this respect, it should be borne in mind that with any given composition, and under any given set of atomization operating parameters, a broad range of particle sizes is produced. The desirable cut is then removed from the material produced and the oversized and undersized particles are recycled. With the above preferred composition, and with the use of optimum operating parameters, the yield of 50 to 100 mesh cut having the desired apparent density and compressibility will be maximized.

The following are screen analysis for three cuts of the above typical example of the preferred composition:

| 50-100 MESH (AD 2.06) | | 40-80 MESH (AD 1.95) | | 30-60 MESH (AD 1.94) | |
|---|---|---|---|---|---|
| SCREEN | WT. % | SCREEN | WT. % | SCREEN | WT. % |
| +50 | 1.6 | +40 | 1.9 | +20 | 0.3 |
| +70 | 34.4 | +50 | 30.3 | +30 | 10.2 |
| +100 | 54.5 | +70 | 57.4 | +50 | 80.2 |
| +140 | 9.3 | +80 | 9.6 | +60 | 6.2 |
| +170 | 0.2 | +140 | 0.6 | +70 | 0.6 |
| +325 | trace | +325 | trace | +100 | 0.2 |
| −325 | 0.015 | −325 | 0.01 | −100 | 2.1 |

The processed and apparatus employed for water atomization of metal powder is well-known in the art and need not be described in particular detail. Two operating parameters are significant with respect to the characteristics of the product produced. The most important factor is the angle of intersection of the water jets with the stream of molten metal. The data herein set forth has been achieved with the use of an annular water manifold having a plurality of jets equally spaced peripherally about the vertical axis of the annulus through which the stream of molten metal passes downwardly under the influence of gravity. Eight water nozzles or jets were included in the annulus each having a circular opening of approximately $\frac{1}{8}$ to 5/32 inch although the nozzle diameter does not appear to be as critical as the angle of intersection of the water jets with the molten metal stream.

It has been found that the apparent density is a function of the included angle of the water jets at the point of intersection with the molten metal stream in accordance with the following formula:

$$\Delta AD = -3.1\Delta(\sin \theta/2)$$

Where $\Delta AD$ is the change in apparent density and $\theta$ is the included angle among the water jets at the point of intersection with the molten metal stream.

It has also been found that the apparent density is a function of the percent by weight of silicon and manganese in accordance with the following formula:

$$\Delta AD = -1.8(\Delta Si) + 0.16(\Delta Mn)$$

where $\Delta AD$ is the change in apparent density; and $(\Delta Si)$ is the change in weight percent of silicon in the composition; and $(\Delta Mn)$ is the change in weight percent of manganese in the composition.

The above formula holds true over the ranges specified as long as all other factors in both the composition and atomization operating characteristics are maintained constant.

It has been found that the included angle should be maintained between approximately 25° and 45° with 38° preferred. The water pressure in the manifold should be maintained between approximately 200 to 400 lbs./in.$^2$ when generating the coarse cut of 30 to 60 mesh and between approximately 400 to 700 lbs./in.$^2$ when generating the relatively fine cut of 50 to 100 mesh for maximum yield. Preferably when producing the coarse cut a pressure of approximately 300 lbs./in.$^2$ should be employed and when producing the fine cut a pressure of approximately 600 lbs./in.$^2$ maintained.

It will be understood by those skilled in the art that many modifications and variations of the present invention may be made without departing from the spirit and the scope thereof.

What is claimed is:

1. A powdered metal filter composition consisting essentially of
    (a) a ferrous based alloy having by weight from approximately 0.60% to approximately 4.0% silicon; from approximately 0.05% to approximately 0.20% Carbon; and up to approximately 2.0% molybdenum; and exhibiting an apparent density of approximately 1.6 to 2.3 gr./cm.$^3$ 2. A powdered metal filter composition in accordance with claim 1 exhibiting a compressability of from approximately 0.120 inches to approximately 0.160 inches.

3. A powdered metal filter composition in accordance with claims 1 or 2 having by weight from approximately 0.30% to approximately 1.0% manganese.

4. A powdered metal filter composition in accordance with claims 1 or 2 having by weight from approximately 2.0% to approximately 10% nickel; from approximately 16% to approximately 26% chromium with the balance iron.

5. A powdered metal filter composition in accordance with claim 4 having a particle size distribution of from approximately 50 to 100 mesh, U.S. Standard.

6. A powdered metal filter composition in accordance with claim 4 having a particle size distribution of from approximately 40 to approximately 80 mesh, U.S. Standard.

7. A powdered metal filter composition in accordance with claim 4 having a particle size distribution of from approximately 30 to approximately 60 mesh, U.S. Standard.

8. A powdered metal filter composition in accordance with claim 4 having a particle size distribution of from approximately 30 mesh to approximately 100 mesh, U.S. Standard.

9. A powdered metal filter composition in accordance with claim 4 in which the apparent density ($\Delta AD$) varies as a function of the change in weight percent of the silicon content ($\Delta Si$) and change in weight percent of the manganese content ($\Delta Mn$) in accordance with the equation $\Delta AD = (-1)(1.8)(-\Delta Si) + 0.16(\Delta Mn)$.

10. A powdered metal filter composition consisting essentially of
(a) a ferrous based alloy having by weight from approximately 0.06% to approximately 0.12% carbon; from approximately 0.50% to approximately 0.90% manganese; from approximately 2.0% to approximately 3.0% silicon; from approximately 4.0% to 7.0% nickel; from approximately 16% to approximately 18% chromium; and up to approximately 1% molybdenum, with the balance iron.

11. A powdered metal filter composition consisting essentially of
(a) a ferrous based alloy having by weight approximately 0.077% carbon; approximately 0.82% manganese; approximately 2.10% silicon; approximately 6.15% nickel; approximately 16.6% chromium; and approximately 0.39% molybdenum with the balance iron with traces of copper, tungsten and cobalt.

12. A powdered metal filter composition in accordance with claim 11 exhibiting an apparent density of approximately 1.94 gr./cm.$^3$ 13. A powdered metal filter composition in accordance with claims 11 or 12 having a compressability of approximately 0.146 inches.

14. A powdered metal filter composition in accordance with claim 13 having a particle size distribution of from approximately 30 mesh to approximately 100 mesh, U.S. Standard.

15. A powdered metal filter composition in accordance with claim 13 having a particle size distribution of from approximately 30 mesh to approximately 60 mesh, U.S. Standard.

16. A powdered metal filter composition in accordance with claim 13 having a particle size distribution of from approximately 40 mesh to approximately 80 mesh, U.S. Standard.

17. A powdered metal filter composition in accordance with claim 13 having a particle size distribution of from approximately 50 mesh to approximately 100 mesh, U.S. Standard.

* * * * *

UNITED STATES PATENT OFFICE
CERTIFICATE OF CORRECTION

Patent No. 4,287,068      Dated September 1, 1981

Inventor(s)    James G. Bewley

It is certified that error appears in the above-identified patent and that said Letters Patent are hereby corrected as shown below:

Claim 9, lines 23-24 after the word "equation" delete [$\Delta AD=(-1)(1.8)(-\Delta Si) + 0.16 (\Delta Mn)$] and insert on one line --$\Delta AD=(-1)(1.8)(\Delta Si)+0.16(\Delta Mn)$--

Signed and Sealed this

*Twenty-ninth* Day of *December 1981*

[SEAL]

*Attest:*

*Attesting Officer*

GERALD J. MOSSINGHOFF

*Commissioner of Patents and Trademarks*